United States Patent Office 2,919,806
Patented Jan. 5, 1960

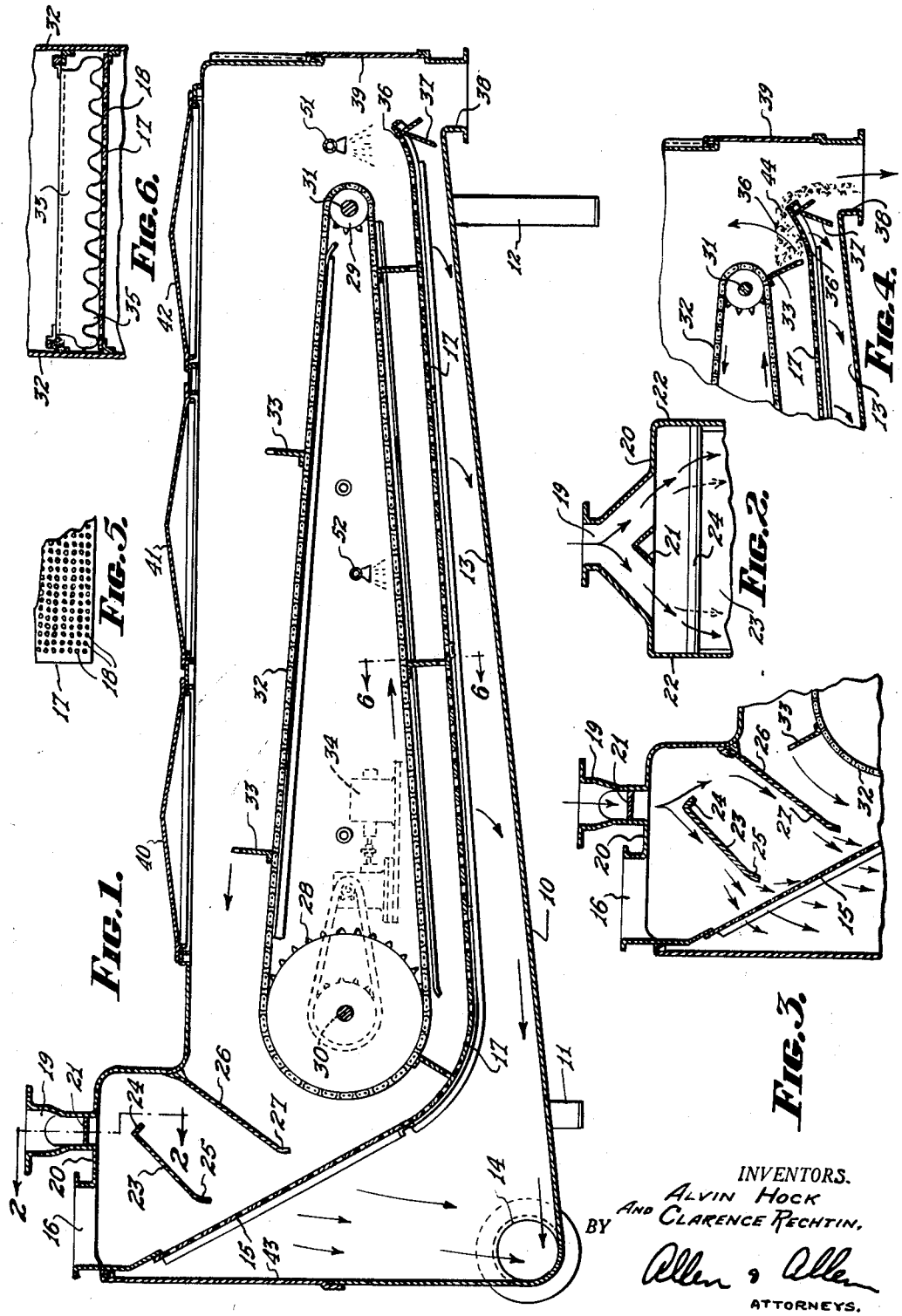

2,919,806

HOP STRAINER

Alvin Hock, Cincinnati, and Clarence Rechtin, Bridgetown, Green Township, Hamilton County, Ohio, assignors to Brighton Corporation, Cincinnati, Ohio, a corporation of Ohio Application July 13, 1956, Serial No. 597,648

20 Claims. (Cl. 210—414)

Our invention resides in the provision of a novel hop strainer especially designed for obtaining instant separation of wort from hops.

Our invention relates in general to that type of mechanism shown in Patent No. 2,412,400 which issued to Alvin Hock on December 10, 1946. Novel features, however, have been incorporated in the machinery of the instant invention as will be emphasized in the passages which follow.

It is an object of our invention to provide a hop strainer which will remove a maximum amount of wort from the hops without bruising or crushing the hops sufficient to impart an undesirable bitterness to the wort. Accordingly, an important feature embodied in the construction of a hop strainer according to the teachings of our invention is that of cascading the wort and hops in a sheet or sheets against a perforated plate or screen in such a manner that the combined wort and hops contact the plate or screen in such a way that the great majority of the wort will strike through the plate or screen instantly while the hops are washed along the plate or screen without driving the hops lint and seed through the plate or screen and without undue splashing.

Another very important object of our invention is to provide means for moving the hops and wort along another perforated plate or plates in such a way as to accomplish further separation of the wort from the hops again without subjecting the hops to extreme pressures or harsh treatment.

A further object of our invention is to provide a final pressing action by means of which the last usable wort is separated from the hops at the final stage in the separation process, this also being accomplished without damage to the hops and wort.

Another important object of our invention is to provide a hop strainer which may be cleaned easily and quickly so as to protect the purity of the brew and make it economical to use.

Yet another object of our invention is to arrange the various perforated plates and strainers so that the liquid portion of the combined wort and hops is distributed equally over the entire strainer surface to insure instant separation of the wort from the hops.

Another important object of our invention is to arrange the strainer so that it will take up a minimum amount of room and so that it can be serviced easily.

These and other objects and advantages of our invention will become apparent to those skilled in the art during the course of the following description and from reference to the accompanying drawings, in which drawings like numerals are employed to designate like parts and in which:

Figure 1 is a longitudinal, vertical section through a hop strainer constructed according to the teachings of this invention, Figure 2 is a section on the line 2—2 of Figure 1, Figure 3 is a fragmentary section of the upper left-hand portion of the machinery as viewed in Figure 1, Figure 4 is a fragmentary section of the lower right-hand end of the machinery as viewed in Figure 1, Figure 5 is a fragmentary perspective of a portion of the bottom strainer plate, and Figure 6 is a section taken on the line 6—6 of Figure 1.

Referring now to Figure 1 it will be observed that our hop strainer comprises a cabinet 10 which may conveniently be supported on legs 11 and 12. The bottom wall 13 of the cabinet 10 slopes downwardly from right to left as viewed in Figure 1. The wall 13 is imperforate. At its lowermost end the wall 13 engages an exit pipe or suitable conduit 14. Sometimes our invention may be adapted to existing wort tanks and the like in which case the cabinet is simply built over the tank but with the wall 13 omitted.

A perforated plate 15, preferably made of stainless steel, is located within the cabinet 10 and slopes downwardly at roughly a 30 degree angle with the vertical from left to right as viewed in Figure 1. In some instances a screen cloth or the like may be employed instead of this plate 15. At its upper end this plate 15 terminates adjacent a vent 16 provided in the upper left hand end of the cabinet 10. At its lower end the plate 15 joins a strainer plate or plates 17 which are provided with a multitude of perforations 18 as best seen in Figure 5.

In the upper left-hand end of the strainer, as viewed in Figure 1, there is an inlet to receive the wort and hops, such inlet 19 being located adjacent the vent 16. Bridging the lower part of the inlet 19 at about the level of the top wall 20 of the cabinet 10 is an inverted V-shaped separator bar 21. When it is desired to handle very large brews it may be desirable to employ a Y-shaped pipe to obtain a proper division and spread of the incoming materials rather than the separator 21. Either of such means 21 also serves to decrease the velocity of the incoming wort and hops.

Disposed between the side walls 22 of the cabinet 10 and sloping downwardly from right to left as viewed in Figure 1, is a spreader plate 23. The upper end of the plate 23 has an angular projection 24 which makes such upper end correspond to an inverted V when viewed in cross-section. The apex defined by the juncture of the plate portions 23 and 24 lies in a vertical plane extending the entire width of the plate through the center of the inlet 19 at right angles to the separator bar 21. Preferably the lower end of the spreader plate 23 is curved downwardly as indicated at 25.

Also fixed within the cabinet 10 is a second spreader plate 26 which is located beneath the plate 23 and which also extends downwardly from right to left toward the perforated plate 15 as again viewed in Figure 1. The lower end of this plate is preferably curved downwardly as indicated at 27. The lower ends 25 and 27 of the plates 23 and 26 respectively terminate somewhat short of the plate 15. The upper end of the plate 26 extends to the right of the upper end 24 of the plate 23. The plates 23 and 26 are set at an angle of approximately 45° so as to direct sheets of wort and hops against the plate 15 without undue splashing.

Mounted within the cabinet 10 and spaced above the perforated strainer plate or plates 17 is a pair of sprockets 28 and 29. These sprockets are suitably journaled on shafts 30 and 31 respectively mounted in conventional manner. A pair of endless chains 32 engage the sprockets 28 and 29. These chains carry a plurality of rakes 33. The chains and rakes may be driven by any suitable means through a conventional motor 34.

Each of the rakes 33 has a plurality of teeth 35. The rakes and chains are located so that the teeth 35 come quite close to the perforated plates 17.

As viewed in Figures 1 and 4 the right hand end of the plate 17 extends beyond the sprocket shaft 31. Adjacent this end of the plate it is turned up slightly as indicated at 36. Fixed at the extreme end of the plate is a baffle 37. Beyond this extreme end of the baffle 37 is a discharge opening 38 for the spent hops. A sparge pipe 51 may also be employed to spray the materials with water to obtain a final separation of wort from hops. Another sparge pipe 52 is also employed, this pipe preferably operating intermittently in timed relation to the chains and rakes.

Located in the right-hand end of the cabinet 10 is a sliding door 39 by means of which an operator may readily gain access to remove the plate portion 36, baffle 37, and plates 17, such arrangement also making it easy to clean the discharge orifice 38. Along the top of the cabinet 10 are located a plurality of panel doors 40, 41 and 42. Another access door 43 is located in the left-hand end of the cabinet 10 as viewed in Figure 1. By this arrangement the plates 15 and 17 are easily removed and all of the apparatus thoroughly cleaned.

The operation of our invention is as follows. The motor 34 is started and the chains 32 and rakes 33 are moved in a counter-clockwise direction. Wort is admitted at the entrance pipe or conduit 19. This mixture of wort and hops is first separated by the bar 21 (or by a Y-shaped pipe) into two substantially equal parts. These parts engage the plate portions 23 and 24. Each such part is thereby divided into two other parts, one of which flows down the spreader plate 23 toward the plate 15 and the other of which falls onto the spreader plate 26 whereupon it will then flow toward the plate 15. By this arrangement we obtain what amounts to four separations of the original stream of wort and hops. Two of these separations flow as a sheet down the spreader plate 23 toward the plate 15 while the other two separations flow as a sheet down the spreader plate 26 towards the plate 15. If desirable additional spreader plates may be employed although in practice we have found two to be preferable. These separating means and spreader plates materially decrease the velocity of the wort and hops so that undesirable hops particles are not driven through the plate or screen 15.

As the wort and hops are thus angularly directed in sheet form against the perforated plate 15, the great majority of the wort will pass through the perforations as indicated by the arrows in Figures 1 and 3 while the hops are washed down the plate 15 towards the plate 17. By separating the incoming wort and hops so as to utilize the pair of plates 23 and 26 to form sheets of the treated material, we are able to handle a greater volume of wort and hops in a given period of time. By locating the plate 15 angularly with respect to the cabinet 10 and by locating the plates 23 and 26 angularly with respect to the plate 15, we are able to obtain a cascading effect which permits the great majority of wort instantly to pass through the perforations of the plate 15 while at the same time washing the hops out of the way immediately. By directing the wort and hops in sheet form, rather than as a stream or jet, against the plate or screen 15, we insure that hops lint and seed are not forced through the plate 15 to contaminate the wort. In this way we also prevent undesirable splashing. In addition, the use of two spreader plates enable the material coming off the lower plate to check the flow of material coming down the plate 15 while at the same time subjecting the hops to a further washing action.

There will still be a certain amount of wort in the hops which reach the plate 17 from the plate 15. It is economically desirable to remove this wort from the hops if it can be done without squeezing the hops to the extent of imparting a bitter taste to the wort. Thus we provide the chain mounted rakes 33 which sweep the hops gently along the upwardly inclined plates 17. As such hops are so moved further amounts of wort may pass through the perforations 18 in the plate 17 and run down the bottom wall 13 to join that wort which passed through the perforations of the plate 15, all such wort being collected and guided to the next place of operation via the exit pipe 14. Intermittent actuation of the sparge pipe 52 will aid this further separation.

We have determined that even the hops which reach the plate area adjacent the shaft 31 have a certain amount of residual wort which is still desirable not to waste. We have also found that by turning up the last plate 17 as indicated at 36 we are able to cause the hops 44 to tend to collect momentarily on the plate section 36 before falling through the discharge orifice 38. As a rake 33 moves additional hops against those which have collected on the turned-up plate section 36 the hops are subjected to a gentle, momentary pressing action which serves to remove the last commercially desirable wort from the hops. This may be supplemented by actuation of the sparge pipe 51. In these days of rising costs it is extremely desirable not to waste any usable wort which has heretofore been the case with other strainers. On the other hand it is not desirable to work over the hops to such an extent that they are unduly bruised or crushed because this will impart an undesirable bitterness to the wort.

Although the just described arrangement of the perforated plates 17, rakes 33 and turned up plate section 36 is quite important, it should be emphasized that perhaps the more critical part of this invention lies in the arrangement of the initial separating means 21, spreader plate 23, spreader plate 26 and plate or screen 15 by all of which means the cascading effect hereinbefore referred to is achieved. This arrangement insures that by far the greater quantity of wort is instantly separated from the hops by almost initial contact of such wort and hops with the perforated plate 15. By directing the wort and hops toward the separator plate 15 as a pair of sheets from the spreader plates 23 and 26 we also insure that the hops are washed down the plate 15 without driving hops lint and seed through the plate. The initial separating means 21—as well as the spreader plates 23 and 26—serves to decrease the velocity of the incoming wort and hops so as materially to decrease the chance of driving undesirable hops particles through the plate 15. And by the further arrangement of the plates 17, 36 and rakes 33, along with the sparge pipes 51 and 52, we insure a final straining of wort from the hops in such a way as to obtain the maximum desirable wort with a minimum of waste. The arrangement of the doors 39, 40, 41, 42 and 43 makes the hop strainer of this invention extremely easy to clean and service.

It will be obvious to those skilled in the art that modifications may be made in our invention without departing from its scope and spirit. It will also be understood that while we have shown our invention as embodied in certain structures, these structures are exemplary only and are not to be included as a limitation on this invention except insofar as they are specifically set forth in the subjoined claims.

Having thus described our invention, what we claim as new and what we desire to protect by United States Letters Patent is:

1. A hop strainer comprising a cabinet having a perforated strainer section, a plurality of rakes, means to move said rakes along said strainer section, a perforated plate angularly located in said cabinet and extending downwardly towards said strainer section, an inlet conduit for hops and wort in the upper part of said cabinet, and means to direct said hops and wort in a sheet angularly against said perforated plate, whereby to decrease the velocity of said hops and wort, said hops and wort directing means including a first imperforate spreader plate located at least in part beneath said inlet conduit and extending angularly towards said perforated plate.

2. The hop strainer of claim 1 including an outlet conduit for wort which passes through said perforated plate and said strainer section, said outlet conduit being adjacent said bottom beneath said perforated plate.

3. The hop strainer of claim 1 in which said inlet conduit is provided with a separator means to divide the incoming stream of wort and hops into a plurality of substantially equal parts prior to such time as the hops and wort are directed in a sheet against said perforated plate, whereby to decrease the velocity of said hops and wort before they reach said hops and wort directing means.

4. The hop strainer of claim 1 including a second spreader plate located beneath said first spreader plate and said inlet conduit, said first spreader plate terminating at its upper end beneath a part of said inlet conduit only.

5. The hop strainer of claim 4 including a separator means in said inlet conduit whereby an incoming stream of wort and hops is divided into a plurality of parts.

6. Apparatus for removing liquids from solids which comprises a perforated plate disposed at an angle with the horizontal, an imperforate spreader plate extending angularly towards said perforated plate, said imperforate spreader plate being located so as to direct the liquids and solids in a sheet against said perforated plate, the line of initial contact of said sheet with said perforated plate being substantially parallel to the horizontal, and an inlet conduit located above said imperforate plate.

7. The apparatus of claim 6 including a second imperforate spreader plate located beneath said first mentioned imperforate spreader plate and substantially parallel thereto, the upper end of said first mentioned spreader plate terminating in the region of the stream issuing from the said inlet conduit so that a part of such stream will reach said second spreader plate.

8. The apparatus of claim 7 in which a separator means is placed in said inlet conduit so as to divide said stream into a plurality of parts to be directed towards said imperforate plates.

9. A hop strainer comprising a cabinet having a sloping bottom wall, upstanding side and end walls, and a top; a vent and an inlet conduit in said top adjacent one said end wall; an outlet conduit adjacent said bottom and said one end wall, said bottom sloping upwardly from said outlet conduit and terminating in a discharge orifice adjacent said other end wall; a perforated plate extending between said side walls and between said inlet and outlet conduits, said plate sloping downwardly from adjacent the top of said one end wall; and a first imperforate spreader plate disposed in part at least beneath said inlet conduit and sloping downwardly towards said perforated plate.

10. The hop strainer of claim 9 including a perforated strainer section extending from adjacent the lower edge of said perforated plate to said discharge orifice, a plurality of rakes, and means to move said rakes along said strainer section.

11. The hop strainer of claim 10 in which said strainer section adjacent said discharge orifice extends upwardly so as to define a partial abutment for material moved by said rakes.

12. The hop strainer of claim 9 including means in said inlet conduit to divide an incoming stream of material into a plurality of parts to impinge on said first imperforate plate.

13. The hop strainer of claim 9 including a second imperforate spreader plate located beneath and parallel to said first imperforate spreader plate, the upper end of said first imperforate spreader plate terminating beneath substantially the center of said inlet conduit, said second imperforate spreader plate underlying all of said inlet conduit, whereby a part of the material from said inlet conduit falls on said second imperforate plate.

14. The hop strainer of claim 13 including means in said inlet conduit to divide an incoming stream of material into a plurality of parts.

15. In a strainer, a housing, a perforated plate disposed at a relatively steep slant within said housing, a conduit to receive the slurry to be strained and direct same into said housing, and an imperforate spreader plate located at least in part beneath said conduit and slanting downwardly towards said perforated plate so as to direct the slurry from said conduit towards said perforated plate in sheet form the line of initial contact of said sheet with said perforated plate being substantially parallel to the horizontal, whereby the velocity of the slurry leaving said spreader plate is materially lower than that coming to said spreader plate from said conduit.

16. The strainer of claim 15 including means in said conduit to slow up the velocity of said slurry even before it reaches said spreader plate.

17. The strainer of claim 15 including a second spreader plate beneath said first mentioned spreader plate and substantially parallel thereto, the upper end of said first mentioned spreader plate receiving a part only of the slurry from said conduit, said second spreader plate receiving slurry directly from said conduit, whereby said slurry is directed towards said perforated plate in at least two sheets, the sheet from said second spreader plate serving to retard the flow of slurry proceeding down said perforated plate from said first mentioned spreader plate whereby to increase the strike-through of liquid from said slurry through said perforated plate.

18. The strainer of claim 17 in which said perforated plate slopes downwardly at an angle of about 30° with respect to the vertical.

19. The strainer of claim 18 in which said spreader plates are set at angles of about 45°.

20. The strainer of claim 19 including separating means for said conduit to increase the area of infeed of slurry to the strainer housing whereby to decrease the velocity of said slurry before it reaches either of said spreader plates.

References Cited in the file of this patent
UNITED STATES PATENTS

| | | |
|---|---|---|
| 139,645 | Adney | June 10, 1873 |
| 752,547 | Harris et al. | Feb. 16, 1906 |
| 1,483,667 | Landreth et al. | Feb. 12, 1924 |
| 2,146,692 | Tiedman | Feb. 7, 1939 |
| 2,471,517 | Chaffee | May 31, 1949 |
| 2,627,349 | Hock | Feb. 3, 1953 |
| 2,633,992 | Hock | Apr. 7, 1953 |
| 2,776,755 | Craig | Jan. 8, 1957 |